No. 830,174. PATENTED SEPT. 4, 1906.
L. A. ROBERTS.
DOUGH MIXING AND KNEADING APPARATUS.
APPLICATION FILED OCT. 17, 1905.
2 SHEETS—SHEET 1.
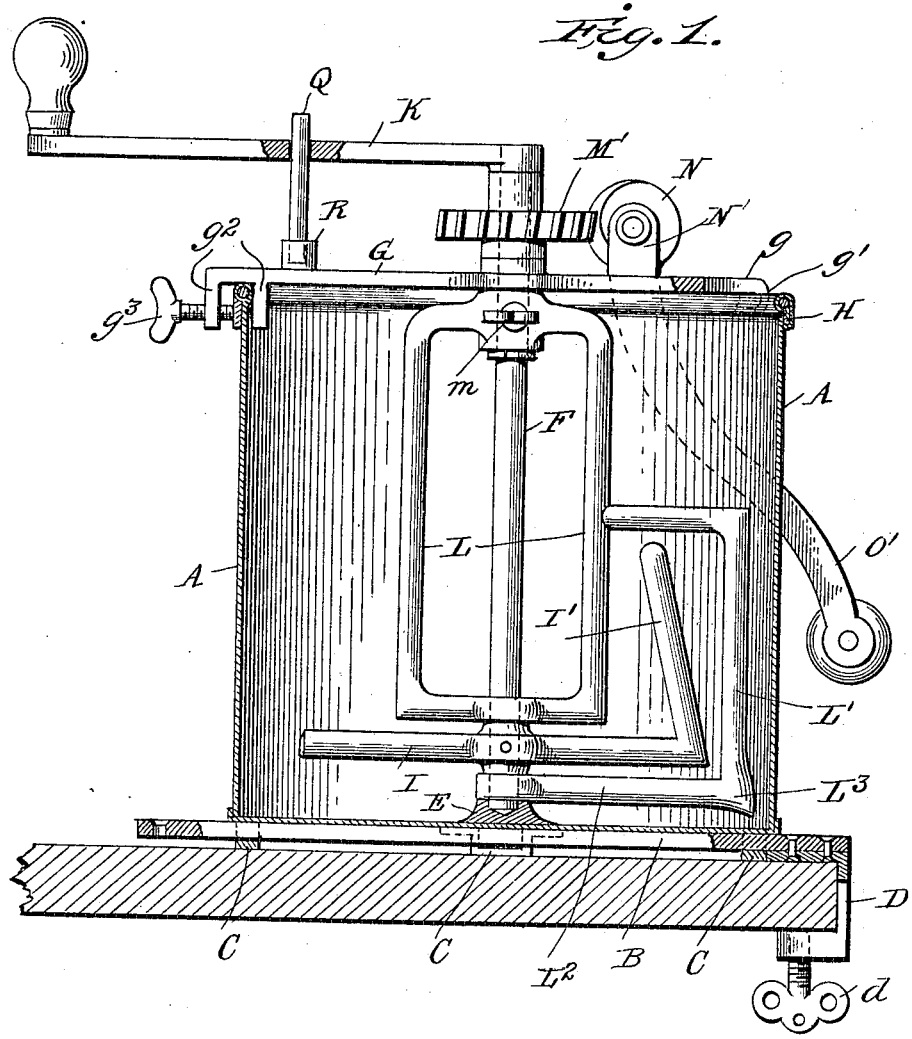
Witnesses
Edwin L. Yewell
Thomas Durant
Inventor
Lewis A. Roberts
By
His Attorneys No. 830,174. PATENTED SEPT. 4, 1906.
L. A. ROBERTS.
DOUGH MIXING AND KNEADING APPARATUS.
APPLICATION FILED OCT. 17, 1905.
2 SHEETS—SHEET 2.
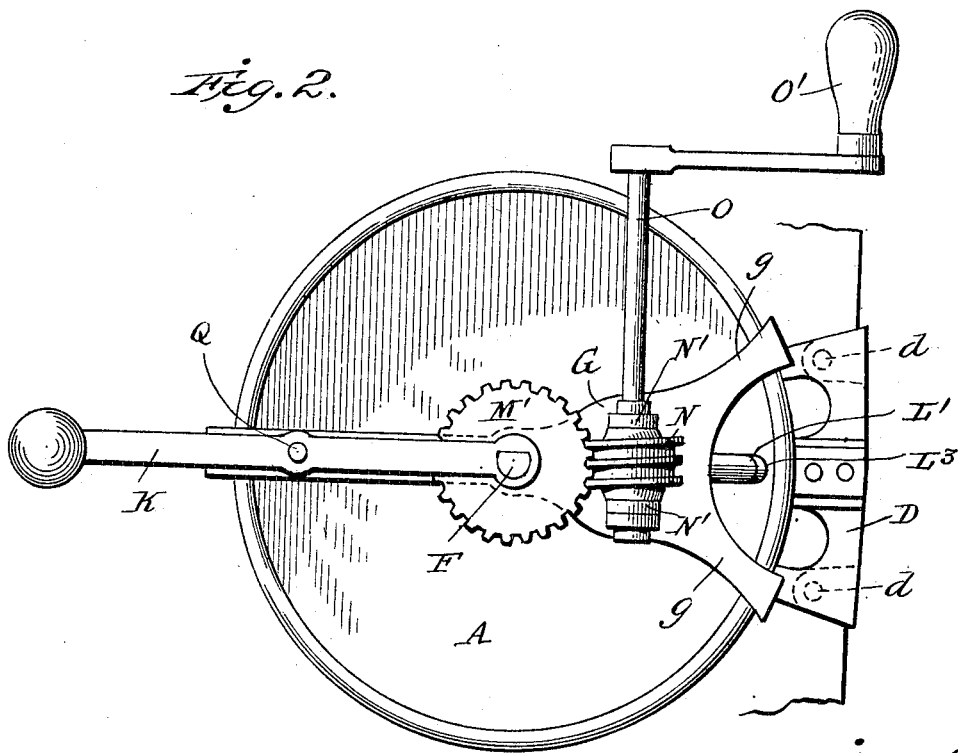
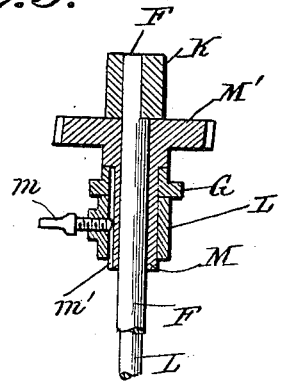
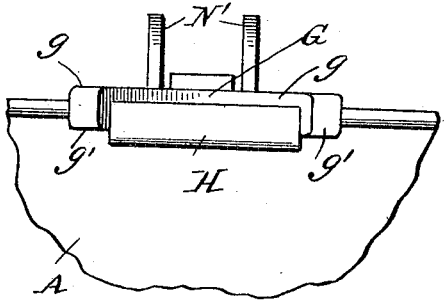
Witnesses
Edwin L. Jewell
Thomas Durant
Inventor
Lewis A. Roberts
By
his Attorneys

UNITED STATES PATENT OFFICE.

LEWIS A. ROBERTS, OF CARBONDALE, PENNSYLVANIA.

DOUGH MIXING AND KNEADING APPARATUS.

No. 830,174.
Specification of Letters Patent.
Patented Sept. 4, 1906.

Application filed October 17, 1905. Serial No. 283,151.

*To all whom it may concern:*

Be it known that I, LEWIS A. ROBERTS, a citizen of the United States, residing at Carbondale, in the county of Lackawanna and State of Pennsylvania, have invented certain new and useful Improvements in Dough Mixing and Kneading Apparatus; and I do hereby declare the following to be a full, clear, and exact description of the same, reference being had to the accompanying drawings, forming a part of this specification, and to the letters of reference marked thereon.

This invention relates to apparatus for mixing and kneading dough in bread-making, and more especially to apparatus of this kind designed for domestic use with a view to saving a large proportion of the labor now involved in the making up of small batches of dough.

The objects of the invention are to provide a simple, cleanly, and easily-operated apparatus which will not only mix the water and starchy contents, but will thoroughly knead and stretch the dough after its preliminary mixing, so as to thoroughly incorporate the gluten content under such conditions as to permit of the effective action of the yeast, thereby insuring a homogeneous compound, which results in bread conforming to the highest standard of excellency.

The invention consists in certain novel details of construction and combinations and arrangements of parts, all as will be now described, and pointed out particularly in the appended claims.

Referring to the accompanying drawings, Figure 1 is a vertical section through a dough mixing and kneading apparatus embodying the present improvements, parts being shown in elevation. Fig. 2 is a top plan view of the same. Fig. 3 is a detail vertical section through a portion of the driving mechanism. Fig. 4 is a detail elevation of the end of the clamp member looking from the right-hand side in Fig. 2.

Like letters of reference in the several figures indicate the same parts.

The body of the apparatus is formed by a receptacle A, preferably of cylindrical form, open at the top only and adapted to be clamped in position on a table or support, such as a shelf. In order to clamp the receptacle firmly and prevent any rotary movement on the support, a clamping member is provided which will engage the receptacle on opposite sides—that is to say, a clamping member is provided with a long arm, lettered B in the accompanying drawings, adapted to pass through two loops or yokes C, secured to the bottom of the receptacle and located in proximity to opposite edges. The clamp itself, lettered D, may be of any usual construction, but is preferably somewhat extended laterally of the arm B and provided with two clamping-screws $d$, whereby a sufficient purchase may be obtained to resist effectually any rotation of the receptacle during the mixing and kneading operations to be hereinafter described.

The mixing and kneading mechanism consists, essentially, first, of a mixing hook or frame adapted to be rotated by the direct application of power to its shaft, and, secondly, of a kneading-frame adapted to be rotated through the medium of power-gearing, whereby the kneading operation may be continued until the desired consistency is reached.

As a most convenient arrangement the receptacle is provided centrally at the bottom with a step-bearing E, adapted for the reception of the lower end of a shaft F, and the shaft F is guided and supported at its upper end by a removable cross-piece or spider G. The latter is bifurcated at one end and the arms $g$ provided with hooks $g'$, adapted to take under the beaded upper edge of the receptacle and to be positioned on the receptacle by a spacing-piece H, as will be readily understood from inspection of Fig. 4. At the opposite end the cross-piece or spider G is provided with a clamping device consisting, preferably, of a pair of downwardly-extending arms $g^2$ and a clamp-screw $g^3$ of ordinary construction.

The shaft F is the mixer-shaft, and in proximity to its lower end it has rigidly mounted thereon a hook-shaped arm or mixer proper of peculiar conformation—that is to say, the body portion I extends substantially horizontally on opposite sides of the shaft, and at one end it is provided with an upwardly and inwardly extending or inclined projection I'. The operating-handle K for the mixer is applied directly to the upper end of the shaft F.

Journaled on the shaft F is a kneading and stretching frame, preferably consisting of a substantially rectangular skeleton frame L and a substantially rectangular projection L' at one side thereof adapted to pass around the projection I' on the kneader and the lower bar L² of which extends beneath the kneader back to the shaft F and is journaled thereon, while the lower angle L³ projects downwardly and outwardly into proximity to the lower corner of the receptacle, so as to act upon the dough which might otherwise accumulate in this part of the receptacle. At its upper end the kneader-frame L is held centrally by being secured to the downwardly-extending sleeve M of a worm-gear M', journaled in the cross-piece or spider G, and said sleeve and worm-gear constitute the direct bearing for the shaft F. The worm-gear and kneader-frame are connected for rotation by a set-screw $m$, and in order to insure the easy assembling of the parts the said sleeve M is preferably provided with a groove $m'$, which will permit the sleeve to enter the upper end of the kneader-frame only when the groove or keyway $m'$ is in line with the set-screw $m$. (See Fig. 3.)

Meshing with the worm-gear M' is a worm-wheel N, journaled in bearings N' on the cross-piece or spider G and mounted upon a shaft O, to which a crank-handle O' is applied. Obviously rotation of the shaft O imparts a slow but powerful movement to the kneader-frame, while rotation of the shaft F through the medium of the handle K will impart a direct but less powerful and more rapid movement to the mixer I I'.

Provision is made for holding the mixer against rotation, preferably consisting of a removable pin Q, adapted to pass through an opening in the handle K and to seat in a socket R on the cross-piece or spider G; but it is obvious that the said handle may be held by other means, if so desired, or the pin Q may be dropped into place on either side of the handle, so as to intersect its path, and thereby prevent rotation.

In operation the ingredients—flour, water, yeast, salt, &c.—in the proper proportions are placed in the receptacle, and assuming that the parts have been assembled ready for operation the mixer is first operated to thoroughly mix the several ingredients. It is found that by reason of the peculiar shape of the mixer and kneading-frame the rotation of the mixer effectually distributes the several ingredients into a uniform mass which quickly assumes the consistency of dough, and as the dough approaches the condition appropriated for the kneading operation it is found that the labor of rotating the mixer by power applied directly thereto becomes too great for the average housewife and in the further manipulation of the apparatus the mixer is locked against rotation, as before described, and the kneading operation carried forward by the rotation of the kneader-frame through the medium of the power-gearing. The kneader operation effected by the rotation of the kneader-frame causes the dough to be stretched and pulled both between the kneader-frame and walls of the receptacle and between the kneader-frame and mixer, and at the same time ample opportunity is afforded for the entry of air and for the effective action of the yeast upon the gluten content in the flour to perfect the chemical action necessary in the making of bread in accordance with the modern standards of excellency. The diagonal or inclined arrangement of the projection I' of the mixer insures the effectual transference of portions of the batch from the center toward the periphery of the receptacle, and vice versa, whereby no portion of the dough will be left unacted on; but, on the contrary, all of the batch will be uniformly drawn, stretched, and kneaded into the final product ready to be set aside for rising.

Having thus described my invention, what I claim as new, and desire to secure by Letters Patent, is—

1. In a dough mixing and kneading apparatus for domestic use, the combination with a receptacle, of independent mixing and kneading frames journaled concentrically therein, means for rotating said frames independently and means for holding one of said frames against rotation while the other is being rotated.

2. In a dough mixer and kneader for bread-making, the combination with the vertically-arranged cylindrical receptacle, independent kneading and mixing frames journaled concentrically in said receptacle on the same axis, means for rotating said frames independently and means for holding one of said frames against rotation during the rotation of the other; substantially as described.

3. In a dough mixing and kneading apparatus for domestic use the combination with a cylindrical receptacle and means for clamping it in position against rotation, of separately rotatable mixing and kneading frames journaled in the receptacle on the same axis, a removable spider in which said frames are journaled at the top of the receptacle, separate driving mechanism for said frames and means for holding one frame against rotation during the rotation of the other frame; substantially as described.

4. In a dough mixing and kneading apparatus, for domestic use, the combination with a cylindrical receptacle and means for clamping it in position against rotation, of a central shaft journaled in the receptacle and having a mixer rigid thereon, a kneading-frame journaled on the shaft and having a projection moving in a path outside of the mixer, means for rotating said shaft and kneader-frame independently and means for holding the shaft in fixed position; substantially as described.

5. In a dough mixing and kneading apparatus for domestic use, the combination with a cylindrical receptacle and means for holding it in position, of a central shaft journaled in the receptacle, a mixer mounted on the shaft, a handle for rotating the shaft, a kneader-frame journaled on the shaft, a worm-gear and worm for rotating the kneader-frame and means for holding the shaft against rotation during the kneading operation; substantially as described.

6. In a dough mixing and kneading apparatus the combination with the cylindrical receptacle, of the spider having one end bifurcated and the arms formed into hooks and downwardly-extending projections having a set-screw to form a clamp at the opposite end, a worm-wheel journaled in the spider, a worm-gear meshing with the wheel and also journaled in the spider, a central shaft journaled in the worm-gear, means for rotating the worm-wheel and shaft independently and a mixer and a kneader-frame arranged concentrically and connected with the shaft and worm-gear respectively; substantially as described.

7. In a dough mixer and kneader the combination with the receptacle, of concentrically-arranged independently-rotatable mixing and kneading frames, separate mechanism for driving said frames, one of said frames embodying an upwardly and inwardly inclined projection and the other rectangular projection through which the inclined projection passes and means for holding one of said frames stationary while the other is in operation; substantially as described.

8. In a dough mixer and kneader, the combination with the receptacle and the rotary mixer embodying a projection, inclined in a plane radial to the axis of a rotary kneader-frame embodying a rectangular projection passing around the mixer and having the lower angle projecting downwardly and outwardly into proximity to the lower corner of the receptacle, whereby the dough will be drawn and stretched between the kneader-frame and the mixer and between the kneader-frame and walls of the vessel and means for holding one of said frames stationary while the other is in operation; substantially as described.

9. In a dough mixer and kneader, the combination with the cylindrical vessel open at the upper end, of rotary mixer and kneader frames journaled concentrically within the vessel, separate mechanism for driving said frames, said mixer embodying a horizontal bar having an upwardly-extending inwardly-inclined projection at one end and said kneader-frame embodying a vertical skeleton frame whose path of motion is within that of the inclined projection, and a rectangular projection at one side thereof whose path of motion is outside of the path of the inclined projection and below that of the horizontal bar; substantially as described.

LEWIS A. ROBERTS.

Witnesses:
   GEO. HOWELL,
   M. G. CLIFFORD.